July 27, 1948.  W. E. BEHNKE  2,445,818
PORTABLE TOPPING KNIFE FOR USE ON ONION CRATES
Filed July 6, 1945
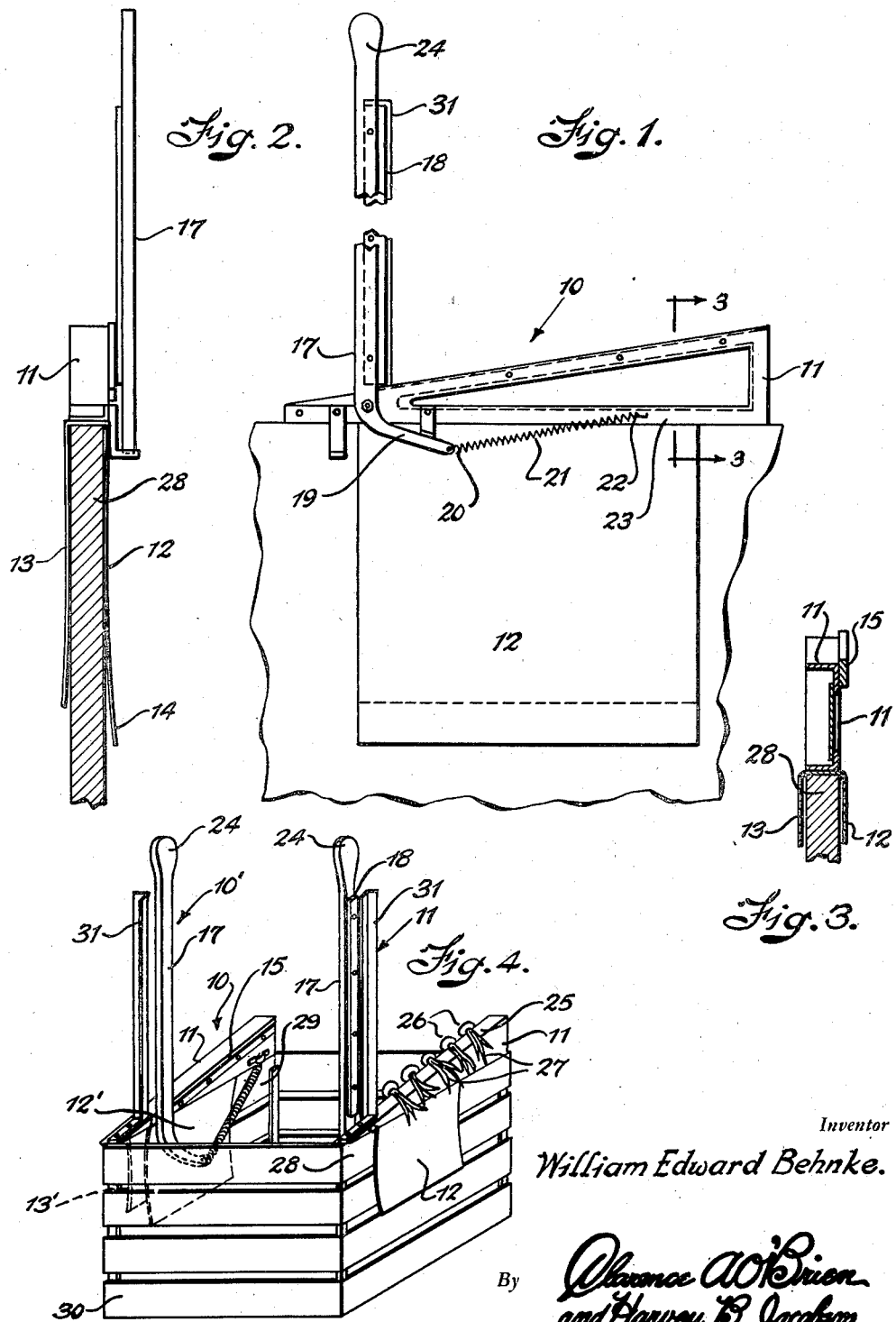
Inventor
William Edward Behnke.
By Clarence A. O'Brien
and Harvey B. Jacobson
Attorneys Patented July 27, 1948

2,445,818

UNITED STATES PATENT OFFICE 2,445,818

PORTABLE TOPPING KNIFE FOR USE ON ONION CRATES

William Edward Behnke, Florida, N. Y.

Application July 6, 1945, Serial No. 603,486

1 Claim. (Cl. 146—83)

This invention relates to cutting devices and has for its object to provide a device for cutting the tops from onions or other tuberous vegetables.

Another object of the invention is to provide a portable vegetable topper provided with an inclined cutter jaw.

Another object of my invention is to provide a vegetable topper provided with means whereby it may be instantly attached or detached from the wall of a crate.

Other features and advantages will become more readily apparent from the following description and the accompanying illustrative drawings in which:

Figure 1 is a side elevational view of my topping device,

Figure 2 is a forward view thereof,

Figure 3 is a sectional view taken on line 3—3 of Figure 1, and

Figure 4 is a perspective view of a pair of my toppers attached to a crate.

In the accompanying drawings as above enumerated and in the following specification, like characters of reference indicate like parts throughout and in which 10, indicates my invention which consists of an inclined jaw supporting member 11, to the outer and inner edges of which are provided spring leaves 12 and 13, the leaf 12, being outwardly flared at its lower end 14. On the member 11, I provide a cutter blade 15, and to the terminal 16, of the member 11, is pivotally secured a lever 17, to which is fixed a cutter blade 18. The member 17, terminates in a substantially right angular extension 19, which extends down below the leaf 12, and to the terminal of which is secured one end 20, of a coil spring 21, the other end 22, of which is fixed to the outer portion 23, of said member 11, whereby upon release of the handle 24, of lever 17, the said handle and its cutter blade will be drawn to upright position. In use, a handful of onions or other vegetables are laid upon the upper edge 25, of the member 11, and the lever 17, is brought down upon the member 11, and its projecting blade 18, severs the vegetable 26, from the tops 27, thereof.

In using this device to the upper edges 28 and 29, of a crate 30, I attach on each side one of my toppers 10 and 10', and the crate is drawn along between two rows of vegetables with an operator on each side of the crate, gathering vegetables from two rows at a time and bring the levers down which separates the tops and delivers the roots into the crate. The purpose of having the member 14, flaring outwardly is in order that the members 12 and 13, may be readily slipped over the edge 28, of the crate.

It is to be especially noted that I provide an upright guard 31, fixed on each member 11, which guard is slightly in advance of the blade edge 18, when held in upright position in order that a user may not accidentally hit the blade with his hand when placing vegetables on surfaces 25. The member 11, is preferably formed of a single piece of sheet metal from which the members 12 and 13, integrally depend.

It is thought that persons skilled in the art to which the invention relates will be able to obtain a clear understanding of the invention after considering the description in connection with the drawings. Therefore, a more lengthy description is regarded as unnecessary.

Changes in shape, size and rearrangement of details and parts such as come within the purview of the invention claimed may be resorted to, in actual practice, if desired.

Having now described my invention that which I claim as new and desire to procure by Letters Patent is:

A vegetable topper comprising a narrow elongated jaw supporting member adapted to rest on the upper edge of a side wall of a vegetable crate, an inverted spring of U-shaped transverse cross section and of a length substantially that of the supporting member fixed to the lower edge of said supporting member and adapted to embrace the upper edge and partially overlie the inner and outer side faces of the side wall of the crate, the upper edge of the supporting member inclining upwardly from the bottom edge of said supporting member to the other end thereof, a ledger blade fixed to the inclined edge of the supporting member, a shear blade, a pivot carried by said supporting member adjacent the convergent ends of the top and bottom edges thereof and connecting the shear blade, said shear blade being adapted to cooperate with the ledger blade in cutting the tops off of vegetables distributed along the top inclined edge of the supporting member, a spring connected to the shear blade and to the supporting member for yieldingly holding the shear blade in a vertical position, a guard extending substantially vertically from the supporting member for guarding the shear blade and a handle extension on the shear blade for manually operating the same.

WILLIAM EDWARD BEHNKE.

REFERENCES CITED

The following references are of record in the file of this patent:

UNITED STATES PATENTS

| Number | Name | Date |
|---|---|---|
| 43,823 | Abbott | Aug. 16, 1864 |
| 743,516 | Jones et al. | Nov. 10, 1903 |
| 1,213,502 | Kildow | Jan. 23, 1917 |
| 1,494,697 | Miller | May 20, 1924 |
| 2,262,991 | D'Arrigo | Nov. 18, 1941 |
| 2,312,530 | Eklund | Mar. 2, 1933 |